Oct. 31, 1950 J. L. HOLLIS 2,528,365

AUTOMATIC FREQUENCY CONTROL

Filed July 1, 1947 3 Sheets-Sheet 1

INVENTOR.
James L. Hollis
BY Darby + Darby
ATTORNEYS

Oct. 31, 1950 J. L. HOLLIS 2,528,365

AUTOMATIC FREQUENCY CONTROL

Filed July 1, 1947 3 Sheets-Sheet 2

INVENTOR.
James L. Hollis
BY Darby & Darby
ATTORNEYS

INVENTOR
James L. Hollis
BY Darby & Darby
ATTORNEYS

Patented Oct. 31, 1950

2,528,365

UNITED STATES PATENT OFFICE 2,528,365

AUTOMATIC FREQUENCY CONTROL

James L. Hollis, Cedar Rapids, Iowa, assignor to Crosley Broadcasting Corporation, Cincinnati, Ohio, a corporation of Ohio Application July 1, 1947, Serial No. 758,291

14 Claims. (Cl. 250—36)

This invention relates to automatic frequency control and particularly to a method and circuit for automatically controlling the center or average frequency of a frequency modulated oscillator.

In the frequency modulated type of radio transmission a radio frequency oscillator generates the basic or center frequency of transmission of the radio transmitter. This frequency is modulated by varying or swinging the frequency back and forth above and below the center frequency. The amount of frequency variation, known as the frequency swing, is determined by the strength of the modulating signal or voltage and is a predetermined amount in normal operation. The rate at which the frequency is varied above and below the center frequency is the frequency of the modulating signal or voltage. Thus, for instance, a frequency modulated transmitter for broadcast purposes would transmit a varying frequency 75 kc. above and below the center or average transmitter frequency. If this signal is modulated by an audio tone of say 1,000 cycles, the frequency is varied 75 kc. above and below the center frequency 1,000 times a second, or a 1,000 cycle rate. Different frequency modulated transmitter stations operate at different center frequencies.

The control of an oscillator generating signals at a radio frequency rate has been something of a problem since their inception. The problem is comparatively simple when fixed oscillators are used as, for instance, in the amplitude modulation type of transmitter. The problem is much greater, however, in a frequency modulated transmitter, in view of the fact that the oscillator frequency, which is the center frequency of the transmitter station is varied. Thus the average or center frequency may stray from that originally planned due to influences on the oscillator circuit such as changes in temperature for instance. Many attempts have been made to solve this long standing problem, several of which have been successful to the extent of maintaining an average or center frequency for a frequency modulated transmitter within the tolerances determined by the Federal Communications Commission. All of these prior art methods of maintaining the center frequency have been extremely complex however, adding a large number of components to the frequency modulation transmitter, adding to its bulk and cost.

It is, therefore, an object of this invention to provide a simple circuit and method of maintaining automatically the center frequency of a frequency modulated oscillator essentially at a predetermined frequency with great accuracy.

It is another object to provide a circuit and method for stabilizing the center frequency of a frequency modulated oscillator which is less complex and more economical than those heretofore known.

Another object is to provide a simple method of determining the deviation and direction thereof of the mean or center frequency of a frequency modulated oscillator from a given frequency, producing a voltage proportional to such deviation and utilizing such voltage to exert a continuous correcting influence.

Another object is to provide a method and means for sampling the frequency produced by an oscillator, establishing a pair of inversely proportional voltages sensitive in amplitude to the oscillator frequency and deriving controlling voltages therefrom.

Another object is to provide a frequency correction method and means for controlling the frequency of an oscillator without the necessity of heterodyning or comparing the frequency of the operating oscillator with an additional standard or fixed frequency oscillator.

Another object is to provide a frequency discriminator circuit in an infinite impedance bridge network.

Other objects will be apparent after a study of the following description, claims, and drawings, in which—

In brief, this invention comprises sampling the output of a radio frequency oscillator, modulated by a reactance tube for instance, by means of two frequency sensitive crystal impedances which are identical in value at a desired frequency, and arranged so that any deviation from the desired frequency will produce unequal and inverse oscillator frequency voltages and which may be applied to a controlling circuit utilizing an infinite impedance bridge for producing a direct current output voltage which may be applied to the modulator for controlling the frequency of the oscillator.

Figure 1:
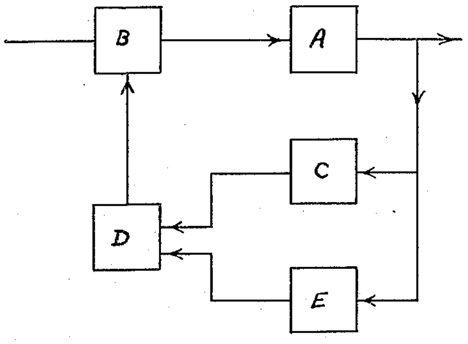
Figure 1 is a simplified illustration, in block diagram form, of the components involved in this invention.

Referring now specifically to Figure 1, the fundamental concept of arrangement of the various elements involved in this invention is shown in block diagram form. The unit A is an oscillator or source of radio frequency voltage and may comprise any well known oscillator circuit for generating the desired frequency. The unit B is a modulator acting on the oscillator to convert low frequency voltages or D. C. voltages into corresponding frequency variations. Thus, for instance, an audio frequency voltage applied to the modulator unit B may be used to modulate the frequency of the oscillator A. The unit B may be any well known reactance tube or other modulator circuit for varying the frequency of the oscillator A. The output from the oscillator A is amplified for transmission in the usual way. The new concept in accordance with my invention is involved in the units C, D, and E of Figure 1.

Unit C, as will be described in more detail later, comprises a pair of frequency selective crystal filters having output voltages which are proportional and inversely proportional, respectively, to the applied frequency from the oscillator A. The output voltage from each of the pair is equal to the other when the frequency is at a predetermined value, but each varies when the applied frequency differs from that predetermined value.

The output from the pair of filters C is applied to the unit D, which is a circuit such as a vacuum tube voltmeter, connected as a bridge network, for measuring the output voltage of the pair of filters and converting the A. C. components into D. C. voltage components. This unit D will be described in greater detail later.

The output of the unit D acts on the modulator unit B; that is, the D. C. voltage output from the unit D acting on the modulator unit B causes a change in the frequency of operation of the oscillator A. If the modulator unit B is a reactance tube, for instance, the D. C. voltage applied thereto may be used to vary the tuning of the oscillator A in a manner which is well known in the art. The D. C. voltage from the vacuum tube voltmeter or bridge circuit D is phased so as to cause the oscillator frequency to remain at a predetermined or prescribed value.

The unit E is a source of D. C. power for operation of the vacuum tube voltmeter bridge circuit D. Thus, the unit E may be a rectifier circuit fed by the R. F. output of the oscillator A, converting the R. F. into D. C. voltage for operating the vacuum tube voltmeter D.

Figure 2:
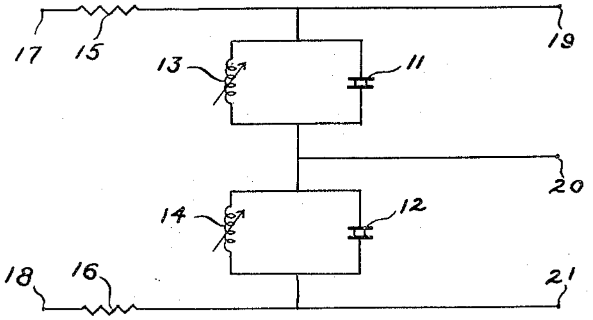
Figure 2 is a schematic diagram of the crystal filters employed in this invention.

The circuit comprising the unit C of Figure 1 is shown in Figure 2. As may be seen, the unit comprises two piezo-electric crystals 11 and 12 each shunted with an inductance 13 and 14. The inductances 13 and 14 are shown as variable but they may be of predetermined fixed value. The resistances 15 and 16 are connected in the circuit between the pair of input terminals 17 and 18 and the respective crystal unit circuits. As may be seen, each crystal unit 11 and 12, together with its associated inductance, is connected in series so that the output from each unit of the pair may be taken from a common output terminal 20 and the outer terminals 19 and 21, respectively. Radio frequency voltage may be applied to this pair of filters in series or in parallel. However, the output voltage appears as two separate voltages across the respective output terminals.

Figure 3:
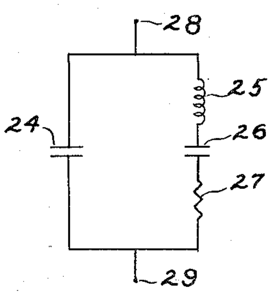
Figure 3 is a simplified equivalent electrical circuit of a piezo-electric crystal.

The operation of the filter circuit of Figure 2 may best be described by referring to the equivalent electrical circuit of a crystal which is shown in Figure 3. The equivalent electrical circuit of a crystal comprises a capacitor 24 in shunt with a series circuit comprising an inductance 25, a capacitor 26, and a resistor 27. As is well understood by those skilled in the art, this circuit will resonate or have a minimum impedance at a predetermined frequency when a voltage is applied to the terminals 28 and 29 across the network. This resonant point is determined by the reactance of the inductance 25 and the capacitor 26, such reactances being of equal value at a given frequency so that series resonance occurs in this leg of the circuit. Under these conditions, that is, at this frequency, the only impedance to the applied voltage is that caused by the resistance 27.

If the frequency of the applied voltage continues to increase, a condition of parallel resonance will be attained. This parallel resonant point, which shall be referred to as the anti-resonant point, is due to the fact that the reactance of the series inductance 25 and capacitor 26 becomes inductive and equal in value to the reactance of the shunt capacitor 24.

Figure 7:
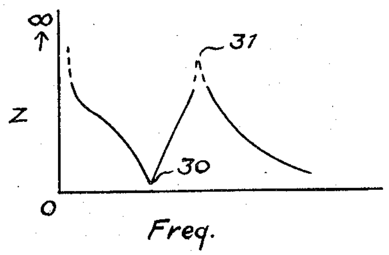
Figure 7 is a graph of the terminal to terminal impedance versus frequency characteristics of a simple piezo-electric crystal.

These two resonant conditions normally occur at closely adjacent frequencies. The range of impedance, however, is from extremely high to very low. The graph or plot of impedance versus frequency characteristic of a normal crystal is illustrated in Figure 7. As may be seen, as the frequency increases, the impedance decreases to a minimum. This minimum point 30 represents the resonant frequency or point of minimum impedance. As the frequency continues to increase, the impedance increases rapidly, reaching a maximum at the parallel resonant or anti-resonant point 31. At this point the impedance across the terminals 28 and 29 is extremely high, as may be seen. As the frequency continues to increase, the impedance again drops off.

The two resonant points representing minimum and maximum impedance, or resonance and anti-resonance, of a single crystal unit, are too closely adjacent in frequency to serve satisfactorily as a filter element for making measurements on a frequency-modulated oscillator having a frequency swing in accordance with the standards of frequency-modulation broadcasting today. Therefore, a means of separating the resonant and anti-resonant points in the frequency spectrum is employed.

Figure 4:
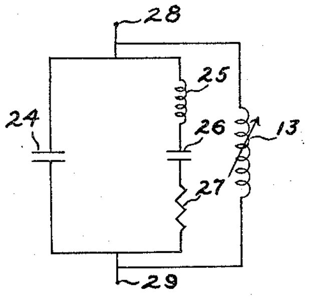
Figure 4 is a simplified equivalent electrical circuit of a piezo-electric crystal with an inductance shunting its terminals.

The means employed is illustrated in Figure 4. Since the frequency at which anti-resonance occurs is dependent to some extent on the shunt admittance of the capacitor 24, an additional shunt reactance consisting of an inductance 13 may be connected across the network so as to change the value of the total shunt admittance of the circuit. This changes the frequency at which anti-resonance occurs.

When a voltage is applied to the terminals 28 and 29 having a varying increasing frequency, it is found that three points of resonance occur. The first resonant point is a parallel resonant condition, or anti-resonant point, occurring at a frequency lower than the minimum impedance or resonant point of the series inductance 25 and capacitor 26 circuit. This lower frequency anti-resonance occurs at a frequency where the inductive admittance of inductance 13 and capacitance 24 in parallel is equal to the capacitive admittance of the series inductance 25 and capacitance 26.

Figure 8:
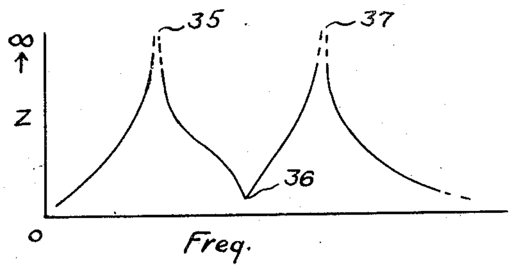
Figure 8 is a graph showing the impedance versus frequency characteristic of the circuit of Figure 4.

The plot representing the impedance versus frequency characteristics of the circuit of Figure 4 is shown in Figure 8. As may be seen, as the frequency is increased from a low value, the impedance of the circuit of Figure 4 across the terminals 28 and 29 increases until a maximum or anti-resonant point is reached. As the frequency is increased further, the impedance falls off rapidly; then, following generally the curvature of the graph as shown in Figure 8, reaches a minimum impedance or resonant point. From this point the impedance across the terminals 28 and 29 again increases until a second point of maximum impedance or anti-resonance is reached, from which the impedance falls off again as the frequency continues to increase. Thus, it will be seen that the crystal unit represented by the equivalent electrical circuit shunted by an inductance 13 has a resonant or minimum impedance point occurring in the frequency spectrum between two anti-resonant points.

The two points at which anti-resonance occurs in a single crystal filter circuit having an inductance in shunt therewith, may be varied by tuning or varying the inductance 13 of Figure 4. When the inductance 13 is tuned or varied, the two anti-resonant points 35 and 37 move horizontally on the curve of Figure 8, or up and down with respect to frequency; that is, the two anti-resonant points, moving together, may be reached at a lower or higher frequency as the inductance 13 is varied. The resonant point 36, representing the condition of minimum impedance, is constant and is not altered by the tuning or variation of the inductance 13. Thus, the slope of the impedance versus frequency curve between the resonant point 36 and the two anti-resonant points 35 and 37 may be varied by tuning the inductance 13.

In a resonant circuit having a high Q, which is provided by a piezo-electric crystal, essentially linear frequency versus impedance characteristics are obtained in the vicinity close to the resonant frequency. The slope of the curve for frequencies above resonance is the inverse of the slope of the curve for frequencies below resonance. For the filter elements as illustrated in Figure 2, piezo-electric crystals are chosen having resonant frequencies which bracket the predetermined or prescribed frequency of operation of the oscillator of unit A. The choice of crystals is dependent on the maximum frequency swing expected from the frequency-modulated oscillator or transmitter, plus a safety factor. Thus, one crystal has a resonant frequency higher than the maximum expected frequency swing of the oscillator, while the other crystal has a resonant point lower in frequency by an equal amount. With this combination the lower frequency slope of the higher frequency crystal and the higher frequency slope of the lower frequency crystal are utilized so that the impedance variation is direct and inverse, respectively, from the two units, with the frequency variation applied to the filter element. The constants of the elements are so chosen that the anti-resonant points preferably are beyond the side band frequencies encountered in the frequency-modulation transmission. This is not necessary, but has been found to be desirable in order to obtain greater linearity of the impedance frequency curve.

Figure 9:
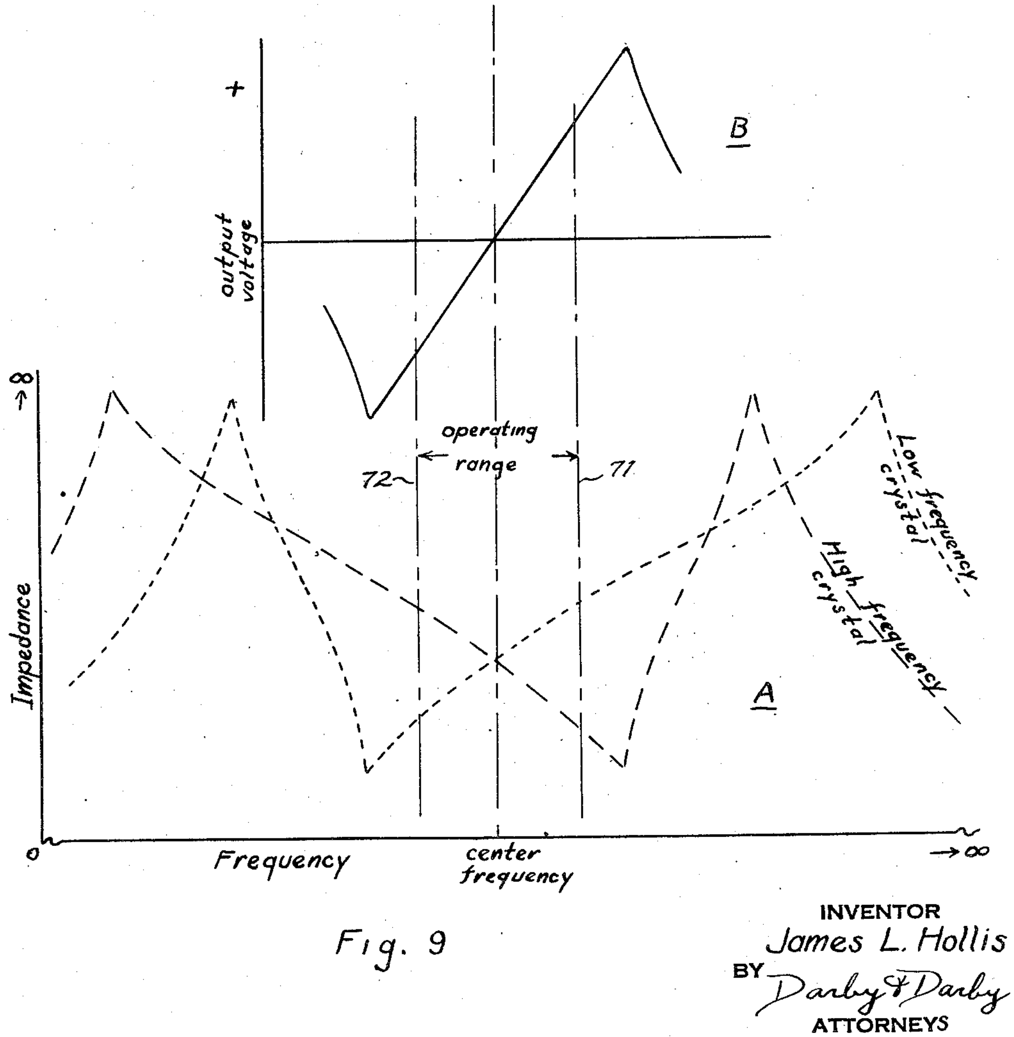
Figure 9A is a graph of two superimposed curves of the characteristics as illustrated in Figure 8 for two crystal networks tuned to slightly different resonant frequency.
Figure 9B is a graph of the composite output voltage versus frequency of the circuits having the characteristics shown in Figure 9A.

The plot of crystal circuit impedance versus frequency characteristics of the filter unit illustrated in Figure 2 is shown in Figure 9A. The center line as appearing on the curve, marked "Control Frequency," represents the center frequency or operating frequency of the oscillator unit A or of the transmitter. As may be seen, crystal units have been chosen so that one has a resonant point above the center frequency, while the other has a resonant point below the center frequency. The impedance versus frequency characteristic of each of the crystal filter elements of the pair comprising the unit C of Figure 1, is shown superimposed in Figure 9A. The anti-resonant points have been varied by tuning the inductance connected in shunt across each crystal, so that the higher resonant frequency crystal has a low anti-resonant point, with its high-anti-resonant point fairly closely adjacent to its resonant point; while the lower resonant frequency crystal has its lower anti-resonant point fairly closely adjacent the resonant point, with its higher anti-resonant point above the anti-resonant point of the higher frequency crystal. In this way the impedance versus frequency curve of each crystal is essentially linear in the operating area of the oscillator and, as may be seen, the impedance of each crystal circuit is equal to the other at the center frequency of the oscillator. The operating region lies well within the frequency area defined by the two resonant points.

As may be seen by referring to the curves of Figure 9A, the impedance of one crystal element circuit increases linearly as the frequency applied to the terminals increases, while the impedance of the other crystal circuit decreases linearly as the frequency increases. On the other hand, the impedance of the first crystal circuit decreases as the frequency applied thereto decreases, while the impedance across the terminals of the second crystal circuit increases as the frequency applied thereto decreases. Thus, the output voltage from each of the pair of crystal filter units is equal at the center frequency, but varies inversely with respect to the other as the frequency increases or decreases from this center value. The resultant output voltage from the pair of crystal filter elements illustrated in Figure 2, is shown by the voltage versus frequency characteristic curve illustrated in Figure 9B. The curve illustrated in Figure 9B, a composite of the curves of Figure 9A, will immediately be recognized by those skilled in the art as the characteristic frequency-modulation voltage or discriminator curve. As may be seen, the voltage curve is essentially linear, having a positive value on one side of the center frequency and a proportional negative value on the other side of the center frequency. This represents the voltage output from the crystal filter element C of Figure 1.

The output voltage from the filter element C is applied to the vacuum tube voltmeter or bridge circuit D, which will now be described in detail. The circuit of the unit D is illustrated in simplified form in Figure 5. As may be seen, two pentode-type thermionic tubes 41 and 42 are connected in a series circuit through D. C. power supplies 43 and 44. Thus, the cathode of tube 41 is connected through a resistor 45 to the B— terminal of the power supply 43. The B+ terminal is connected to the anode of tube 42. The cathode of tube 42 is connected through a resistor 46 to the B— terminal of the power supply 44, while the B+ terminal is connected to the anode of tube 41. A capacitor 47 is connected in shunt across the cathode resistor 45 of tube 41, while a capacitor 48 is connected in shunt across the cathode resistor 46 of tube 42. The cathode of each tube is connected to the suppressor grid; that is, the grid adjacent the anode. The first grid—that is, the grid which is normally the input grid—is connected to B— in each tube through resistors 49 and 50.

The screen grid of each of the pentode tubes 41 and 42 is connected to a source of signal input 51 and 52, respectively. Thus, the signal input is connected between the cathode and screen grid of each tube. The signal or voltage output of each of the units 51 and 52 represents the voltage output of the pair of filter elements of Figure 2, which is illustrated as unit C in Figure 1.

Connected from B— to ground of each of the power supplies 43 and 44 is a capacitor 54 and 55, respectively. As may be seen by referring to Figure 4, these capacitor connections complete a bridge circuit in which are located the pentode tubes 41 and 42. The circuit of each of the pentode tubes 41 and 42 represents the vacuum tube voltmeter or bridge circuit shown as unit D in Figure 1. The power supply units 43 and 44 represent the unit shown as E in Figure 1.

The operation of the circuit of Figure 5, therefore, is as follows: Tubes 41 and 42 are receiving-type pentodes operating at nearly infinite plate impedance; resistors 45 and 46 are biasing resistors, while the capacitors 47 and 48 are part of the biasing circuit. The resistors 49 and 50 are for additional biasing purposes. The values of the biasing resistors 45, 46, 49 and 50 are high, so that the tubes 41 and 42 remain at plate current cutoff for all but the most positive excursion of the screen to cathode voltage.

The anode or plate-to-cathode potential is maintained at a higher positive value by the power supplies 43 and 44, than the maximum positive potential ever attained by the screen grid. Under these conditions the plate current is, for all practical purposes, completely independent of reasonable plate-to-cathode potential variations (in the order of 10 to 20 per cent). Thus, the plate current is dependent solely on the peak value of the screen grid potential. By applying the radio frequency voltages to be compared between the cathode and screen grid, the plate current in each tube will be directly proportional to the magnitude of the radio frequency voltage.

As mentioned previously, the two tubes 41 and 42 constitute a series loop and must, therefore, conduct equal average currents. Short-time differences in current are possible, however, because of the presence of the capacitors 54 and 55. These short-time differences in current can be absorbed by these capacitors. Any current flow into the capacitors 54 and 55, however, places a charge thereon which develops a D. C. potential across their terminals. The polarity of this potential will depend on the direction of current flow. Since the potential across these capacitors adds to the cathode-to-anode voltage of one tube and subtracts from the cathode-to-anode voltage of the other tube, it must not be allowed to become too great in comparison to the voltages from the power supplies 43 and 44 or it will begin to affect the plate current flow through the tubes. If, on the other hand, the two tubes return to a condition of equal plate current flow after a short period of unequal plate current flow, the capacitors 54 and 55 will have a charge equal to the product of the difference in plate current and the time this difference was allowed to exist. This charge can be removed only by a reversal of the plate current difference to produce the same product of current difference and time.

As explained above, the plate current in the tubes 41 and 42 is controlled by the voltage applied to their screen grids. Since, as previously mentioned, this voltage is obtained from the frequency selective filters illustrated in Figure 2 and described previously, there will be one and only one frequency at which the plate current flow in the two tubes will be identical. At this frequency the charge on the capacitors 54 and 55 will neither increase nor decrease, but will remain at whatever value there was at the time of plate current equality.

This D. C. voltage resulting by the charge in the capacitors 54 and 55 may be utilized as the controlling voltage for the frequency-modulating device represented as unit B in Figure 1.

As is well understood by those skilled in the art, the output frequency of an oscillator is dependent not only on the natural resonant frequency of the oscillator itself, but also on the D. C. controlling voltages applied to the modulating circuit—which may be a reactance tube, for instance. If the frequency of the output differs from the predetermined or prescribed value, a steady D. C. voltage must be applied and accurately maintained at the control terminals so as to "correct" the frequency—that is, cause the frequency of the oscillator to return to the prescribed value. It is the function of the vacuum tube voltmeter circuit of this invention to apply and maintain this required D. C. voltage.

If a modulating device is used having an input shunt impedance which is essentially infinite in value, the charge on a capacitor may be used to supply the controlling D. C. voltage. It is necessary that the charge on this capacitor be at all times the value necessary for maintaining the frequency at the prescribed value. Changes in the amount of correction required become, therefore, changes in the charge required in the capacitor. Thus, this D. C. voltage acts to restore and maintain the frequency which produces identical or equal plate current in the two tubes.

Figure 5:
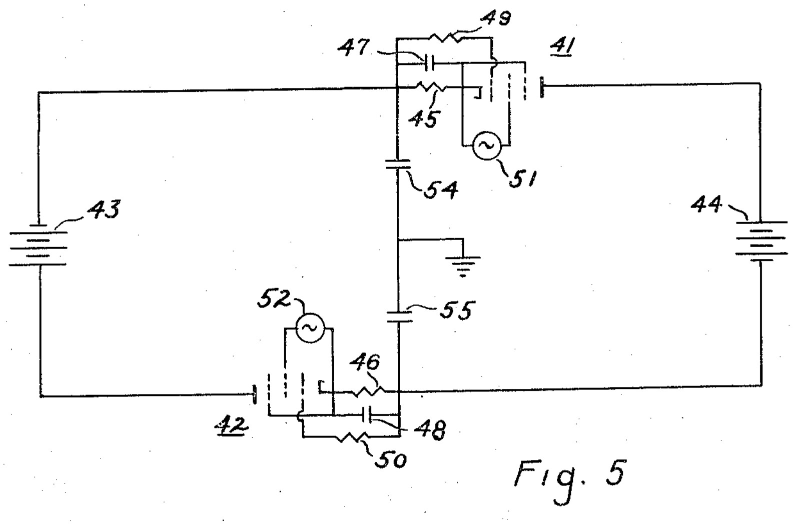
Figure 5 is a simplified schematic diagram illustrating the bridge network principles of the invention.
Figure 6:
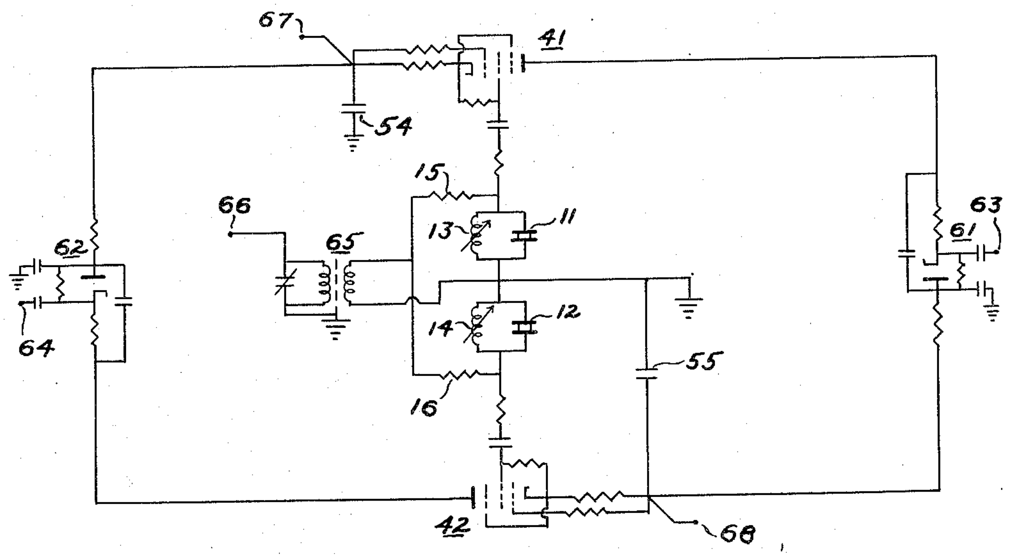
Figure 6 is a simplified schematic diagram illustrating the circuit in accordance with this invention.

The manner in which the crystal filter or discriminator circuit illustrated in Figure 2 is combined with the bridge circuit of Figure 5 is shown in the schematic diagram of Figure 6. Figure 6 is a simplified diagram of the complete circuit for operation in accordance with this invention.

The pentode tubes 41 and 42 in the bridge circuit are connected in series with their respective power supplies to form the closed loop. An R. F. rectifier may be used as the power supply for these pentode tubes. Thus, in Figure 6, diode tubes 61 and 62 are substituted as R. F. rectifiers for the D. C. power supply 43 and 44 shown in Figure 5. These R. F. rectifiers comprise the unit identified by the reference character E in Figure 1. Any of the usual rectifier circuits may be used. The input terminals 63 and 64 may be connected to the oscillator output as the source of R. F. voltage as shown in Figure 1.

The crystal filter or discriminator circuit shown in Figure 2 is connected in the screen grid circuit of tubes 41 and 42 replacing the signal source identified by the characters 51 and 52 in Figure 5. The output from the oscillator is fed to a transformer 65 through terminal 66. This output voltage is fed to the crystal units 11 and 12, shunted by their respective inductances 13 and 14, through resistances 15 and 16. The center tap of the pair of crystal filters is grounded, as shown. Thus, the output of each of the pair of crystal filters is fed to the screen grid of the respective tubes 41 and 42.

The capacitors 54 and 55 are connected in the circuit as previously explained in connection with Figure 5. In this way the current flow in each of the current tubes 41 and 42 is modified by the input voltage applied to their respective screen grids by the pair of crystal units. The capacitors 54 and 55 complete the bridge circuit. At the balance condition, current will flow through the tubes 41 and 42 and their respective power supply rectifiers, the current in each tube being of equal value. For this condition to exist the output voltage of each of the pair of crystal units must be equal.

Thus, for instance, if the capacitors 54 and 55 were initially short circuited so as to prevent a charge from accumulating thereon, the oscillator frequency may be adjusted to a value which produces equal current in the tubes 41 and 42. If now the short circuit is removed from the capacitors 54 and 55 the capacitors will have no charge thereon since no current will be flowing therethrough. Under this condition no voltage will appear across either of the terminals 67 and 68 to ground.

If now the oscillator frequency changes, to a higher value, for instance, the impedance of one of the crystal units will be greater than the impedance of the other. As may be seen by referring to Figure 9 the impedance from the crystal unit 11, for instance, which may, for the purpose of illustration, be the low frequency crystal, will be increasing as the frequency increases beyond its resonance point. At the same time the impedance of the crystal unit 12, which will be the high frequency crystal, will be decreasing as the frequency increases in approaching its resonant point. Thus, the voltage output across each of the filter units will be unequal. These unequal voltages which are fed to the tubes 41 and 42, respectively, will cause one of the tubes 41, to carry a greater current while the other tube 42 carries less current. Under this condition, a charge will appear across the capacitors 54 and 55, the bridge circuit now being in a condition of unbalance. With a charge appearing across the capacitors, a D. C. voltage will appear across the terminals 67 and 68 to ground. This D. C. voltage applied to the modulator circuit, unit B of Figure 1, acts to cause the frequency of the oscillator to return to its original value.

If, for instance, the frequency of the oscillator was caused to increase by a temperature change acting on the oscillator elements, the correcting voltage appearing across the terminals 67 and 68 acting on the modulator unit will cause the oscillator frequency to decrease to return to the original value. Since the charge on the capacitors 54 and 56 continues to exist, the correcting voltage will continue to act on the oscillator circuit although the bridge circuit returns to its balance condition when the oscillator returns to center frequency. Thus, so long as the temperature variation has caused the frequency of the oscillator to stray from its original value the correcting voltage is applied to correct for the straying frequency.

If now the temperature returns to its original value so that the oscillator is again detuned, the resulting unbalance in the bridge circuit will remove the charge appearing across the capacitors 54 and 55. As a result, the correcting voltage will be removed and the oscillator will be retained at its center frequency.

If the oscillator frequency strays below the desired center frequency, then a charge of opposite polarity will appear across the capacitors 54 and 55 and the correcting voltage applied to the modulator circuit will be of opposite polarity, thus, again, correcting for the frequency deviation of the oscillator.

The particular circuit illustrated in Figure 6 having two output terminals 67 and 68, connected on either side of ground, is particularly applicable to a push-pull type modulator and oscillator. If a single ended or single tube oscillator is used then one of the terminals, 67 for instance, may be grounded. The correcting voltage will appear across the terminal 68 to ground.

This vacuum tube voltmeter or bridge circuit operating on the difference of the two crystal filter or discriminator output voltages will indicate zero voltage at that frequency at which the crystal circuits have identical impedances and will indicate both the magnitude and direction of any deviation of the oscillator frequency from the center frequency. The oscillator center frequency will be the frequency at which there is balance in the bridge circuit.

This bridge circuit also has the important feature that it retains the indication of frequency error after the frequency has been corrected. That is, although the voltages across the crystal circuits are again of equal value the charge on the capacitors is retained until an equal and opposite charge is applied thereto. This retention by the capacitors, of the charge, causes the bridge circuit to continue to indicate the original frequency error or, in other words, the output voltage therefrom continues to exert an influence on the oscillator circuit.

The fact that the oscillator is modulated by an A. C. modulating signal of the frequency modulation type does not alter the considerations of the operation described above if all currents and voltages are considered as average values. Since the modulation is produced by alternating voltage which has no direct current component, the product of the average voltage and time over the positive half cycle equals exactly the product of the average voltage and time over the negative half cycle. In other words, in a frequency modulation system the product of the average frequency deviation and time for which the frequency is above the center frequency equals the product of the average frequency deviation and time for which the frequency is below the center frequency. It is this center frequency which must be maintained at a definite predetermined or prescribed value.

In order that this may be accomplished, linear impedance versus frequency characteristics of the crystal filter networks over the range of the frequencies included by the A. C. modulation is necessary. Thus, the operating range of frequencies lies, in Figure 9, between the positive slope to resonance of the low frequency crystal and the negative slope to resonance of the high frequency crystal. As explained previously, the crystal filters are chosen so that the resonant points lie beyond the frequency swing of the frequency discriminator. Thus, the operating range is within the area illustrated in Figure 9*a* by the dashed lines 71 and 72. It will be seen that within this operating range, the impedance versus frequency characteristics of each of the crystal filter units is essentially linear.

This necessary linearity is accomplished to a practical degree by the proper selection of the filter resistances 15 and 16 and the anti-resonant frequency points of the crystal filter circuits. No general figures can be given of the actual values of the resistance and anti-resonant frequency points since they depend on the crystal characteristics. For the purpose of illustration, however, it has been found in an operating model that resistances 15 and 16 may be 10,000 ohms while the higher anti-resonant frequency of the low frequency crystal and the lower anti-resonant frequency of the high frequency crystal were approximately 0.25% of the respective resonant frequencies removed from the resonant frequency. The resonant frequencies were removed by 0.2% from the prescribed center frequency.

It will be seen that the circuit provides an infinite impedance bridge network in which the ability to charge the capacitor is independent of the voltage existing on the capacitor. The network provides for frequency sampling without frequency changing and, therefore, is particularly adaptable as a frequency indicator.

There has thus been illustrated a simple circuit and method, operating however with great accuracy, for automatically maintaining the center frequency of a frequency modulated transmitter oscillator or automatic frequency control. What has been described represents a preferred form of the invention. It will be obvious that many variations are possible without departing from the scope thereof.

What is claimed is:

1. An electrical circuit comprising in combination a source of radio frequency energy, a pair of crystal filter circuits connected to said source, a bridge network having the current flow therein controlled by said filter circuit and means in said bridge network including a pair of vacuum tubes, each of which has at least one grid coupled to one of said filter circuits for deriving a voltage for controlling the frequency of said source.

2. An automatic frequency control for a frequency modulated radio transmitter having an oscillator and modulating means for varying the output of said oscillator comprising a pair of filter circuits connected to the output of said oscillator, a bridge network including a capacitive branch connected across a closed series thermionic tube circuit, said pair of filter circuits being connected to control the balance of said bridge network, said bridge network being connected to control the frequency of said oscillator.

3. The combination according to claim 1 in which said bridge network comprises thermionic tubes connected in a closed series network.

4. An automatic frequency control for an oscillator comprising means for tapping a portion of the output voltage of said oscillator, means including a normally balanced bridge network subject to unbalance for utilizing said tapped voltage portion to derive a voltage having a magnitude dependent on the magnitude of an oscillator condition which tends to produce an undesired initial deviation of the average frequency of said oscillator, means for storing said derived voltage and means for utilizing said stored voltage to overcome the effects of said condition.

5. An automatic frequency control circuit comprising means for tapping off a portion of the voltage output of said oscillator, crystal filter means for utilizing said tapped voltage to derive a pair of voltages inversely proportional to each other having a magnitude dependent on the frequency of said oscillator and means including a bridge network having a pair of vacuum tubes grid-controlled by said voltages for deriving a controlling voltage from said pair of voltages for controlling the frequency of said oscillator.

6. A circuit for automatically controlling the center frequency of a frequency modulated oscillator comprising crystal filter means for utilizing a portion of the output of said oscillator to establish a pair of voltages which are unequal when said oscillator output is of a frequency different from said center frequency, and means including a pair of vacuum tubes grid-controlled by said voltages for utilizing said unequal voltages to establish a control voltage having a magnitude dependent on the voltage difference of said pair of voltages and having a polarity dependent on the direction of frequency difference from center frequency.

8. A frequency discriminator circuit comprising two thermionic tubes and space current supplies connected in a closed series circuit comprising two loops, a capacitor network connected across said closed series circuit as a leg common to both loops to form a bridge network and a filter network to grid-control the current flow in said tubes thereby to control the charge on the capacitor network.

8. In combination, a pair of crystal filters having different resonant frequencies, inductances individually shunting said filters, said filters having such parameters that the rising impedance-frequency characteristic between resonance and upper-frequency anti-resonance of the low frequency crystal-inductance circuit intersects the falling impedance-frequency characteristic between lower-frequency anti-resonance and resonance of the high-frequency crystal-inductance circuit, whereby both circuits have the same impedance at a predetermined frequency between the resonant frequencies of the two crystal circuits, said inductances being so adjusted that the higher resonant-frequency crystal has its high anti-resonant point closely adjacent to its resonant point while the lower resonant-frequency crystal has its lower anti-resonant point closely adjacent its resonant point, the high anti-resonant point of the low frequency crystal being above the high anti-resonant point of the high frequency crystal and the low anti-resonant point of the high frequency crystal being below the low anti-resonant point of the low frequency crystal, whereby the impedance characteristic of each crystal circuit is essentially linear through a wide operating range on each side of said predetermined frequency.

9. A bridge circuit comprising a pair of loop circuits having a common leg, a pair of like electron tubes individually arranged with their anode-cathode paths in said loop circuits, a pair of space current sources for said tubes individually arranged in circuit in said loops, a pair of capacitors in series included in said common leg, each of said tubes having its cathode circuit connected to one of said capacitors, said loops being so arranged that when the currents in the loops are equal no substantial change in the condition of charge of said capacitors occurs but when control effects applied to said tubes render said currents unequal a resultant potential difference across said common leg produces a change in the charge on said capacitors.

10. The combination in accordance with claim 9, wherein each of said tubes is a pentode having a very high plate impedance and wherein said control effects are applied to the screen grid electrodes of said tubes.

11. The combination in accordance with claim 9, wherein the junction of said capacitors is grounded, and means for applying to said tubes control effects which are functionally related to the magnitude and directional effect of any factor tending to cause undesired deviation of a frequency-modulated signal from its center frequency, said means comprising a pair of crystal filters having different resonant frequencies but impedance characteristics which intersect at said center frequency, resistors individually in series with said filters, means for applying to both of said filter-resistor circuits in parallel a frequency-modulated signal having said predetermined normal center frequency, and means for individually and separately coupling said filter circuits to the screen grid electrodes of said tubes, thereby to disturb the balance of said bridge circuit by an amount which is functionally related to said factor tending to cause an undesired deviation of said signal from its predetermined normal frequency, said unbalance resulting in the development of charges on said condensers at least one of which produces a steady control potential for overcoming said factor.

12. A bridge circuit comprising a pair of loop circuits having a common leg, a pair of like electron tubes individually arranged with their anode-cathode paths in said loop circuits, each cathode being provided with and connected to a bias resistor, a pair of space current sources for said tubes individually arranged in circuit in said loops, a pair of capacitors in series between those terminals of said resistors which are not connected to said cathodes, said loops being so arranged that when the currents in the loops are equal no substantial change in the condition of charge of said capacitance occurs but when control effects applied to said tubes render said currents unequal a resultant potential difference across said common leg produces a change in the charge in said capacitance.

13. The combination in accordance with claim 12, wherein each of said tubes is a pentode having a very high plate impedance and wherein said control effects are applied to the screen grid electrodes of said tubes.

14. The combination in accordance with claim 12 and means for applying to said tubes control effects which are functionally related to the magnitude and directional effect of any factor tending to cause undesired deviation of a frequency-modulated signal from its center frequency, said means comprising a pair of crystal filters having different resonant frequencies but impedance characteristics which intersect at said center frequency, impedances individually in series with said filters, means for applying to both of said filter-impedance circuits in parallel a frequency-modulated signal having said predetermined normal center frequency, and means for individually and separately coupling said filter circuits to the screen grid electrodes of said tubes, thereby to disturb the balance of said bridge circuit by an amount which is functionally related to said factor tending to cause an undesired deviation of said signal from its predetermined normal frequency, said unbalance resulting in the development of a charge on said capacitance which produces a steady control potential for overcoming said factor.

JAMES L. HOLLIS.

REFERENCES CITED

The following references are of record in the file of this patent:

UNITED STATES PATENTS

| Number | Name | Date |
|---|---|---|
| 1,691,909 | Crouse | Nov. 13, 1928 |
| 1,875,329 | Chiveix | Sept. 6, 1932 |
| 1,928,765 | Schaffer | Oct. 3, 1933 |
| 1,968,617 | Osnos | July 31, 1934 |
| 2,005,083 | Hansell | June 18, 1935 |
| 2,041,040 | Barden | May 19, 1936 |
| 2,075,526 | Koch | Mar. 30, 1937 |
| 2,105,096 | Peterson | June 11, 1938 |
| 2,112,826 | Cook | Apr. 5, 1938 |
| 2,151,127 | Logan | Mar. 21, 1939 |
| 2,207,540 | Hansell | July 9, 1940 |
| 2,251,064 | Martin | July 29, 1941 |
| 2,266,658 | Robinson | Dec. 16, 1941 |
| 2,312,079 | Crosby | Feb. 23, 1943 |
| 2,354,827 | Peterson | Aug. 1, 1944 |
| 2,374,734 | Crosby | May 1, 1945 |
| 2,374,735 | Crosby | May 1, 1945 |
| 2,396,688 | Crosby | Mar. 19, 1946 |
| 2,434,293 | Stearns | Jan. 13, 1948 |